United States Patent
Prottey

[11] Patent Number: 5,877,679
[45] Date of Patent: Mar. 2, 1999

[54] SENSOR FOR A PNEUMATIC TIRE

[75] Inventor: Frederick Vernon Prottey, Burntwood, England

[73] Assignee: Sumitomo Rubber Industries, Ltd., Hyogo-ken, Japan

[21] Appl. No.: 917,343

[22] Filed: Aug. 26, 1997

[30] Foreign Application Priority Data

Sep. 13, 1996 [GB] United Kingdom .................. 9619181

[51] Int. Cl.$^6$ ................................................. B60C 23/02
[52] U.S. Cl. ........................ 340/442; 340/447; 340/665; 73/146.5
[58] Field of Search ................... 340/442–448, 340/665; 73/146.5

[56] References Cited

U.S. PATENT DOCUMENTS

| | | | |
|---|---|---|---|
| 5,483,827 | 1/1996 | Kulka et al. | 73/146.5 |
| 5,540,092 | 7/1996 | Handfield et al. | 73/146.5 |
| 5,573,610 | 11/1996 | Koch et al. | 340/447 |
| 5,731,754 | 3/1998 | Lee, Jr. et al. | 340/447 |

*Primary Examiner*—Daniel J. Wu

[57] ABSTRACT

A sensor for counting the rotations of a pneumatic tire on a vehicle comprising a rigid base member adapted for attachment to the radially inner surface of the tire tread region, at least two spaced-apart mounting links, a force sensing member disposed between said mounting links for producing a countable output signal and means for processing said output signal such that on rotation of the tire, a force variation is applied to the force sensing member due to the changes in circumferential radius of curvature of the tire tread in contact with the road.

14 Claims, 2 Drawing Sheets

SENSOR FOR A PNEUMATIC TIRE

BACKGROUND OF THE INVENTION

The present invention relates to a sensor for a pneumatic tire and more particularly to a sensor for measuring the number of rotations of a tire in service and producing an output signal indicating the result.

It has long been an objective in tire and vehicle development to be able to effectively monitor a tire's condition, particularly its pressure and distance travelled. Tire pressure monitoring has been approached by various means including the use of a detector unit mounted integrally with the tire which transmits on demand, or in some cases continuously, a tire pressure signal.

SUMMARY OF THE INVENTION

Accordingly, it is an object of the present invention to provide a sensor and means of sensing the number of rotations of an individual tire which may, if required, be incorporated in the tire pressure sensor mounted integrally with the tire.

In one aspect of the present invention a sensor for counting the rotations of a pneumatic tire on a vehicle comprises a rigid base member adapted to be attached to the radially inner surface of the tire tread region, at least two spaced-apart mounting links, a force sensing member disposed between said mounting links, producing a countable output signal and means for processing said output signal such that on rotation of the tire a force variation is applied to the force sensing member due to the changes in circumferential radius of curvature of the tire tread in the contact to the road. Preferably the force measuring member is linked to inside of the tread region by means of a resilient link member.

The sensor may be an electronic component and the signal processing unit is an electronic circuit. The electronic circuit preferably includes a transmitter and a memory to store the output signal. The transmitter may operate continuously with use of the vehicle or upon receiving an interrogation request from an external detector. A preferred force sensing member comprises a force sensitive resistor, the resistance of which is monitored by the electronic circuit.

The present invention also includes a tire characterized by a sensor for counting rotations of the tire as above.

According to a final aspect of the invention, the invention comprises a method of counting the rotations of a pneumatic tire on a vehicle using a force sensor mounted on a rigid base member which is attached to the radially inner surface of the tread region of the tire at two points circumferentially in front of and behind the sensor, to sense movement of the inner surface of the tire tread regions adjacent to the sensor. The tread region passes through the tire contact patch on the road, taking a countable signal from the sensor, counting said signals to produce a result equivalent to the number of rotations of the tire and transmitting the results to a display.

BRIEF DESCRIPTION OF THE DRAWINGS

Further aspects of the present invention will be apparent from the following description, by way of example only, of an embodiment of the present invention in conjunction the attached diagrammatic drawings in which.

DETAILED DESCRIPTION OF THE INVENTION

Figure 1:
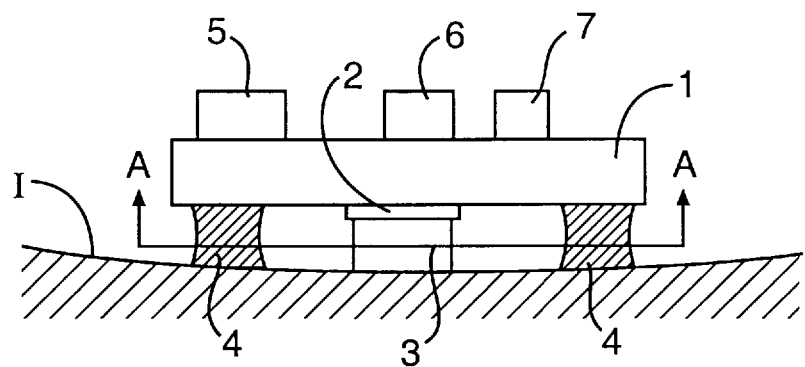
FIG. 1 shows a sensor mounted on the inner surface of a tire.
Figure 2:
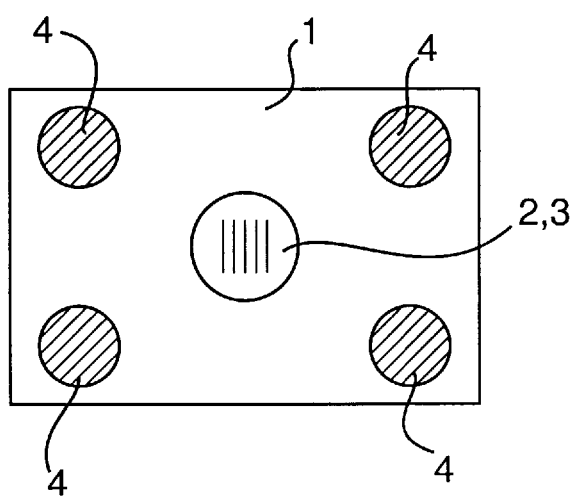
FIG. 2 is a plan view of the sensor taken along line A—A.

As seen in FIG. 1 the sensor comprises a rigid base member 1 which is rectangular, having dimensions of approximately 38 mm×33 mm. Attached to the center of one side of the rigid base member 1 is a force sensing member 2 which comprises a force sensing resistor which is a disc having a diameter of 7–8 mm and a thickness of about 0.5 mm. The force sensing resistor is connected to an electronic circuit (not shown) mounted on the rigid base member which monitors the resistance of the force sensing resistor. Additional electronic components are provided to give a counter which counts the number of times the force sensing resistor moves through a given pre-set resistance threshold caused by a applied force which will be described below. A resilient link member 3, which comprises a dense foam material, is bonded to the force sensing resistor 2. The cross section of the link member 3 is chosen to suit the sensing area of the force sensing resistor.

A suitable force sensing resistor is sold by Interlink under Code Number FSR 149, although other such devices may be used.

Figure 3:
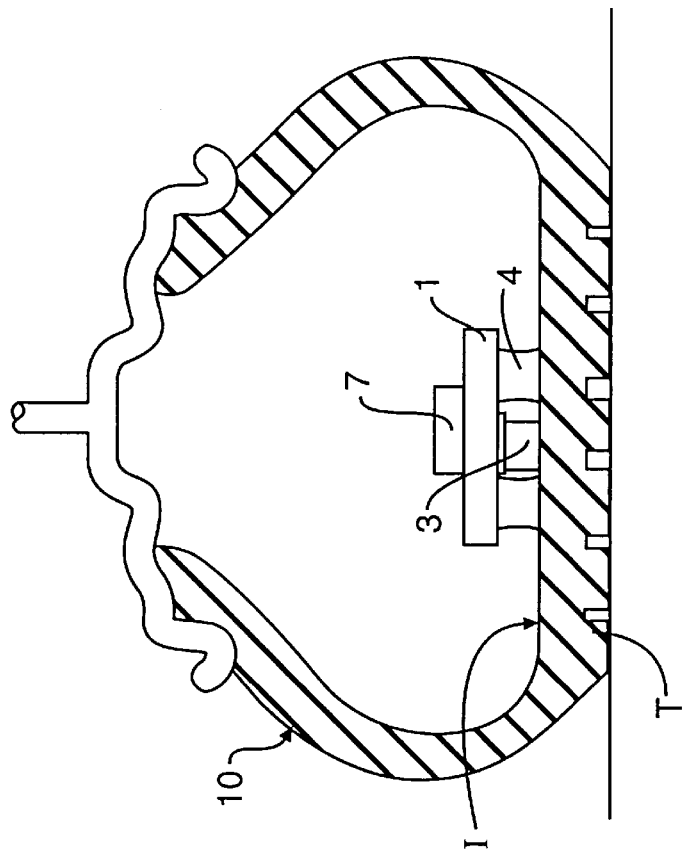
FIG. 3 shows in radial cross section the sensor mounted within the tire in proximity to the external sensor and display.
Figure 3:
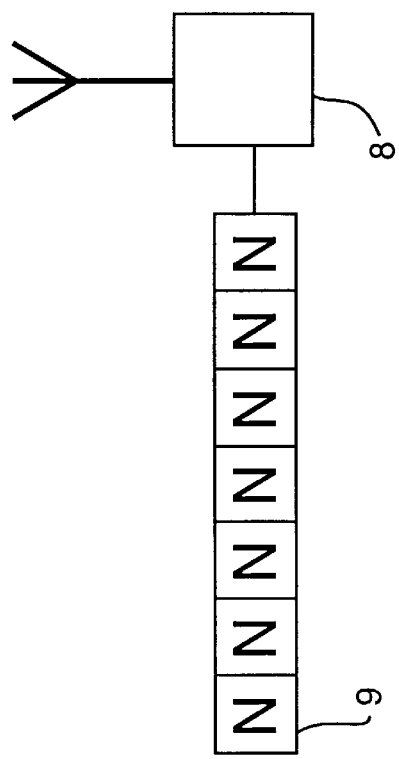

The sensor is mounted on the inside I of a tire 10 underneath the tread region T. It is mounted with the longer 38 mm long side extending in the circumferential direction of the tire tread centerline and preferably is mounted on the centerline of the tire tread to ensure that the sensor is postioned away from the edges of the tread region. The sensor is mounted on the inner liner of the tire by four approximately 10 mm diameter links or pillars 4 of adhesive comprising a one-component medium modulus polyurethane based fast cure adhesive, such as for example SIKAFLEX 221-A available from SIKA Limited. The adhesive pillars 4 are made to be of a sufficient length so that the dense foam adhesive link member 3 is in contact with the inner surface I of the tire with the tire in its normal non-inflated, non-deflected condition. A convenient way of arranging the adhesive pillars 4 for achieving this length is to provide on the radially outer surface of the link member 3 a self-adhesive surface which sticks to the liner of the tire when the sensor is attached thereto and locates the sensor until the adhesive cures. FIG. 1 also diagrammatically shows a signal processing unit 5, a data storage memory 6 and an electronic data transmitter 7 mounted on the base member 1. FIG. 3 shows an external sensor 8 and a display 9 disposed in close proximity to the tire and force sensor.

In the resultant assembly the force sensitive resistor is in a substantially non-loaded condition when the tire has its normal curvature. In use of the vehicle as the tire enters and leaves the contact patch with the road, the radius of curvature of the circumferential centerline of the tire is increased due to the flattening of the tire against the road. This causes a compressive force to be applied to the force sensing resistor 2 due to the reduction in its spacing from the inner surface of the tire. Excessive compressive force which could unduly strain the adhesive pillars 4 is prevented by compression of the link member 3.

Thus each time the tire rotates and the sensor goes through the contact patch, a force is applied to the force sensing resistor causing its resistance to change and the electronic circuitry counts the number of such deflections. The count is stored in a memory and either transmitted to a receiver mounted on the vehicle or more preferably transmitted to an external sensor located a short distance from the tire but external thereto and giving the count when requested by the external device.

Accordingly the sensor allows interrogation of the tire as to how many deflections it has gone through and the output may be calibrated in miles or kilometers, as required. As will be immediately apparent the rigid base member may also include pressure, temperature and other sensors so that a set of data relevant to the particular tire can be transmitted when required.

The link member 3 may be of any suitable resilience chosen so as to transmit sufficient compression force for the sensor utilized to give a countable change.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A sensor for counting rotations of a pneumatic tire on a vehicle which comprises a rigid base member adapted for attachment to the radially inner surface of a tire tread region, at least two spaced-apart mounting links, a forced sensing member disposed between said mounting links for producing a countable output signal and means for processing said output signal such that on rotation of the tire, a force variation is applied to the force sensing member due to the changes in circumferential radius of curvature of the tire tread in contact with the road.

2. The tire comprising a sensor for counting rotations of the tire in service on a vehicle according to claim 1.

3. The sensor according to claim 1, wherein the force sensing member is linked to the inside of the tread region by a resilient link member.

4. The tire comprising a sensor for counting rotations of the tire in service on a vehicle according to claim 3.

5. The sensor according to claim 1, wherein the sensor is an electronic component and a signal processing unit is provided on the base member.

6. The tire comprising a sensor for counting rotations of the tire in service on a vehicle according to claim 5.

7. The sensor according to claim 5, wherein an electronic data transmitter is mounted on the base member.

8. The tire comprising a sensor for counting rotations of the tire in service on a vehicle according to claim 7.

9. The sensor according to claim 5, wherein a data storage memory is disposed on the base member which allows for storage of data for later interrogation by a sensor which is provided external of the tire.

10. The tire comprising a sensor for counting rotations of the tire in service on a vehicle according to claim 9.

11. The sensor according to claim 5, wherein the force sensing member comprises a force sensitive resistor, the resistance of which changes with the force applied to the resistor.

12. The tire comprising a sensor for counting rotations of the tire in service on a vehicle according to claim 11.

13. A method of counting rotations of a pneumatic tire on a vehicle comprising using a force sensor mounted on a rigid base member which is attached to a radially inner surface of the tread region of the tire at two points circumferentially in front of and behind the sensor for sensing movement of the inner surface of the tire tread regions adjacent to the sensor as the tread region passes through a tire contact patch on the road, taking a countable signal from the sensor, counting each countable signal to produce a result equivalent to the number of rotations of the tire and transmitting the result to a display.

14. The method according to claim 13, wherein the force sensor is a force sensitive resistor, the countable signal is produced as a variation in resistance and electronic circuit means mounted on the rigid base is used to produce the results.

* * * * *